United States Patent [19]

Kasugayama et al.

[11] 4,342,041

[45] Jul. 27, 1982

[54] INK JET TYPE RECORDING APPARATUS

[75] Inventors: Yukio Kasugayama, Yokohama; Koji Terasawa, Fuchu; Yoshihumi Hattori, Kawasaki, all of Japan

[73] Assignee: Canon Kabushiki Kaisha, Tokyo, Japan

[21] Appl. No.: 173,999

[22] Filed: Jul. 31, 1980

[30] Foreign Application Priority Data

Aug. 15, 1979 [JP] Japan ................................ 54-103188

[51] Int. Cl.[3] ............................................ G01D 15/16
[52] U.S. Cl. ............................................... 346/140 R
[58] Field of Search ........ 346/140 R, 140 PD, 140 IJ, 346/140 A, 75

[56] References Cited

U.S. PATENT DOCUMENTS

| | | | |
|---|---|---|---|
| 2,216,248 | 10/1940 | Moore | 346/140 R |
| 3,373,435 | 3/1968 | Strong | 346/140 R |
| 3,522,607 | 8/1970 | Felton | 346/140 |
| 3,731,648 | 5/1973 | Gerber et al. | 346/140 R |
| 3,805,276 | 4/1974 | Ishii | 346/140 |

*Primary Examiner*—Donald Griffin
*Attorney, Agent, or Firm*—Fitzpatrick, Cella, Harper & Scinto

[57] ABSTRACT

An ink jet type recording apparatus is disclosed which includes a main tank containing recording liquid, a subsidiary tank receiving a supply of recording liquid from the main tank through a supply line, a recording head to which the recording liquid is fed from the subsidiary tank through a feeding pipe and a carriage carrying thereon the subsidiary tank and recording head. The recording liquid is supplied to the subsidiary tank from the main tank by a pumping pressure produced in the supply line when the carriage is running. The supply line is fixed at an optionally selected point in such manner than the segment of the supply line extending from the selected point to the subsidiary tank may swing move above the fixed point describing a circular arc in accordance with the running of the carriage.

3 Claims, 7 Drawing Figures

INK JET TYPE RECORDING APPARATUS

BACKGROUND OF THE INVENTION

1. Field of the Invention

The present invention relates to an ink jet type recording apparatus and more particularly to such recording apparatus comprising two recording liquid containing tanks having different capacities and a recording head mounted on a carriage. According to the present invention, the smaller capacity one of the two tanks and the recording head are united together into a single unit which is mounted on the carriage. In response to the running of the carriage, the recording liquid is automatically supplied to the smaller tank from the larger one.

2. Description of the Prior Art

The basic form of conventional ink jet recording apparatus having an open ink feed system is schematically shown in FIG. 1. The recording head 1 is composed of, for example, a piezo-electric element in a manner known per se and has a supply line 2 connected to one end part of the head. Recording liquid(ink) is fed to the recording head 1 from a tank 3 through the supply line 2. To maintain the atmospheric pressure within the tank 3 there is provided a vent hole 5 in the upper wall of the tank. The recording liquid 4 is always allowed to reach the tip end of the head 1. In response to electric signals applied to the piezo-electric element of the head 1, droplets of recording liquid are jetted from the tip end of the head 1, that is, the jet orifice 1A to effect printing of characters, marks etc. on a recording paper. The recording liquid consumed as jet droplets 6 at the recording head 1 is successively supplied from the tank 3 through the supply line 2 owing to the surface tension at the orifice 1A and the difference in liquid level between the liquid level in the tank 3 and that in the head 1. Therefore, the recording head 1 can always retain a sufficient amount of recording liquid at its orifice 1A.

The known ink jet type of recording apparatus described above involves the following problems:

One of the problems concerns the arrangement of the tank 3 and the recording head 1. When the above mentioned type of known recording apparatus is incorporated into a portable table computer or a portable typewriter, there is the possibility that the body of the apparatus may be inclined while being carried in one's hand. In this case, since the tank 3 and the tip end of the recording head 1 are arranged distant from each other, the difference between the liquid level in tank 3 and that in jet orifice 1A may be deviated from the proper value. Such a change of the liquid level difference, if occurred, will lead to retrogradation of the meniscus of recording liquid or leaking of the recording liquid from the orifice 1A. For ink jet printing it is essential to keep the meniscus formed by the jet orifice 1A at a right position. If the meniscus is moved backward into the supply line 2, the operator has to restore it to the right position. This may be done, for example, by applying a pressure to the recording liquid from the side of the tank 3. However, leakage of the recording liquid brings about some unrecoverable trouble. The leakage recording liquid will make the inner part of the apparatus dirty. In any case, these unfavorable phenomenons give the operator much trouble. Every time after transportation of the table computer or portable typewriter, the operator must do the work of restoring the retrograded meniscus or worry about any leak of recording liquid which may make the apparatus dirty.

The above mentioned unfavorable phenomenons of leaking of recording liquid or retrogradation of the meniscus will be enhanced when vibration or impact is applied to the apparatus or when the recording head 1 is struck against another member at the end of every printing at a high speed. As is well known to those skilled in the art, the meniscus at the jet orifice 1A is very sensitive to vibration or impact. If some vibrating force or impact force is applied to the body of apparatus, the recording head 1 or the supply line 2, then the meniscus is easily broken away which may result in inward retrogradation of the meniscus into the supply line 2 or leaking of droplets outward. In this case, if the difference in liquid level between tank 3 and head 1 is higher than the proper value, the meniscus once broken can not be restored to its original right position at once. The recording liquid continues to flow out from the orifice or the meniscus continues to move backward into the supply line 2 up to the position in which the liquid level difference and the surface tension get balanced finally. These vibrations and impacts are inevitable for such type of apparatus in which printing is carried out by reciprocating a recording head 1 relative to a recording medium such as printing paper. Therefore, it may be said that such sensitiveness of recording head 1 to vibration and/or impact constitutes a fatal drawback of the apparatus. For this reason, the reciprocating speed of recording head 1 is limited very much, which constitutes an obstacle against the speed-up of printing with this type of recording apparatus.

Another problem concerns air bubbles occasionally introduced into the supply line 2. Occasionally a bubble enter the supply line 2. The bubble will not particularly hinder liquid droplets from jetting from the orifice of head 1 so long as it remains in the supply line 2. However, when the bubble moves toward the head 1 accompanied by the recording liquid and enters the head, there occurs a serious problem. The bubble prevents liquid droplets from smoothly jetting out from the orifice. This trouble becomes much more serious in particular when the deformation effect of an electric-mechanical converter is used as the jet driving source of the recording head 1. In this case, energy produced by the deformation is absorbed and lost by the bubble and no energy can be transmitted to the recording liquid. Thus, the jet of the recording liquid is completely stopped and therefore a continuous and stable printing is no longer assured.

FIGS. 2A and B schematically show an example of an ink jet type recording apparatus which has been proposed to solve the problems described above. Designated by 10 is a recording head and 11 is tank. The head 10 and tank 11 are united together into a unitary component encased in a container 12. The container 12 is fixedly mounted on a carriage 13 which is in turn slidably mounted on a shaft 14. To effect printing, the carriage 13 moves along the width of a printing paper not shown. The recording head 10 is composed of a piezo-electric element 15, nozzle part 16, jet orifice 17 and supply pipe 18. The supply pipe 18 is L shaped and extends from the main body of the head 10 into the tank 11 containing recording liquid 19. The recording head 10 receives the recording liquid 19 through the supply pipe 18. To prevent the supply pipe 18 from being moved by vibration or impact, it is fixed to a wall 20 so provided as to cover the container 12. The tank 11 has a vent hole 21 to maintain the pressure within the tank 11 at atmospheric pressure. Designated by 22 and 23 are connectors for externally applying electric signals to the piezo-electric element 15 of the head 10. While not shown, the piezo-electric element 15 and the connectors 22, 23 are connected by signal lines. The orifice 17 is provided at the tip end of the nozzle part 16 and the supply pipe 18 terminates at 18A. In the shown example, the distance between 17 and 18A can be adjustably preset to a most appropriate value.

As will be seen from the foregoing, the arrangement of the apparatus shown in FIG. 2 is featured in that the recording head 10 and tank 11 are united together into a unitary member encased in a container 12 and also in that the supply pipe 18 for feeding the recording liquid to the head 10 is introduced into the tank 11 with the length of the pipe being preset to a most appropriate value. Owing to these features, the previously mentioned troubles of leakage of recording liquid from the head and retrogradation of the meniscus formed at the orifice into the supply pipe can be eliminated even when the apparatus is subjected to inclination, vibration or impact.

While the improved apparatus shown in FIG. 2 has appreciable advantages over the conventional ones, it has been found that the ink jet recording apparatus shown in FIG. 2 still involves some problems as hereinafter described.

In the case of a miniature computer or other instruments for which high speed printing is required, it is desirable to lessen the weight of the reciprocating carriage part as much as possible in view of the power of driving motor useful for driving the carriage. To meet the requirement, the amount of recording liquid to be stored in the liquid tank of the apparatus must be limited in term of weight. As an example, in case of such printer with which one character is composed of 5×7 dot matrix, it has been proved by experiments that when the recording head has a jet orifice of 50 to 100 μm in inner diameter, only 1 cc of recording liquid is sufficient enough to print 150 to 200 thousand characters. This means that if the ink jet recording apparatus is provided with a task capacity of about 3 cc, then there can be obtained an electronic machine equipped with an ink jet recording apparatus such as a table computer with printer which is useful for a long time without any need of supply or exchange of the recording liquid. It may be possible to design such a recording liquid containing tank for which exchange of tank or supply of recording liquid is required only once every half year. However, this exchange of tank or supply of liquid to the tank brings forth a problem no matter how small the frequency of tank exchange or ink supply may be. For a table computer or other similar electronic devices there may be caused some operational troubles by the work necessary for exchange of the tank or supply of recording liquid even when the work is simplified to the utmost extent.

Another problem is caused by change of weight load on the carriage carrying the tank. As the recording liquid in the tank is consumed, the weight load on the carriage changes gradually with time. Assuming that there is used a tank having 3 cc capacity, the change of tank weight will reach about 3 g when comparison is made between the weight of the tank being full and that being vacant. When a linear motor or the like is used as the carriage driving motor, this change of weight loaded on the carriage will cause a change of carriage driving speed and also a change of printing speed. Since the printing speed varies from time to time, it is no longer possible to keep the print quality at a desired level.

SUMMARY OF THE INVENTION

Accordingly, it is a general object of the invention to solve the problems involved in the ink jet type recording apparatus according to the prior art as mentioned above.

It is a still more specific object of the invention to provide an ink jet type recording apparatus which has two separate recording liquid containing tanks one of which is smaller in capacity than the other and in which the recording liquid is automatically supplied to the smaller tank from the larger one every time when the carriage carrying a recording head and the smaller tank is moved to effect printing.

To attain the objects according to the present invention, the recording head and the smaller tank are united together into a unitary unit which is encased in a container. The container is mounted on the carriage. The smaller tank is connected with the larger capacity tank through a recording liquid supply line formed by a flexible tubing material so that the recording liquid can be automatically supplied to the smaller tank from the larger one through the supply line in response to the movement of the carriage.

Other and further objects, features and advantages of the invention will appear more fully from the following description taken in connection with the accompanying drawings.

DESCRIPTION OF THE PREFERRED EMBODIMENT

A preferred embodiment of the invention is described in detail with reference to FIGS. 3 and 4.

Figure 3:
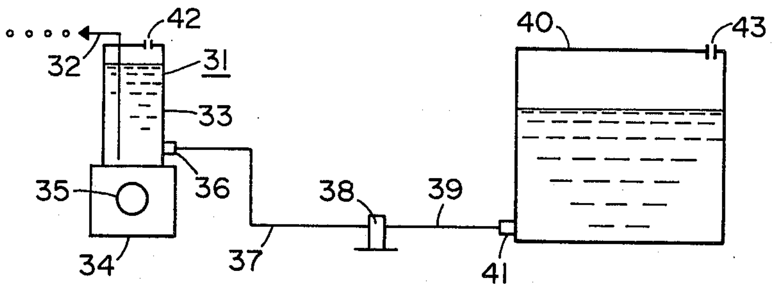
FIGS. 3 and 4 show an embodiment of ink jet type recording apparatus according to the invention.

In FIG. 3, a recording head 32 and a subsidiary tank 33 are united together to form a unitary unit, head/tank unit 31 which is mounted on a carriage 34. The carriage 34 is slide movably mounted on a shaft 35 and is driven by a carriage driving motor not shown. Thus, the carriage 34 can move along the shaft in a reciprocating motion under the control of the driving motor. The subsidiary tank 33 has a liquid inlet 36 provided at the lower portion of one side wall of the tank. A flexible supply line 37 is connected with the inlet 36 at its one end. The other end of the supply line 37 is connected with another supply line 39 via a fixed point 38. The supply line 39 extends to a main tank 40 and is connected with a liquid outlet 41 provided at the lower portion of one side wall of the main tank. The tanks 33 and 40 have each one vent hole 42, 43 provided in the respective top walls so that the pressure within the tanks remains unchanged at atmospheric pressure irrespective of change in volume of the recording liquid in the respective tanks.

The ink jet type recording apparatus shown in FIG. 3 operates in the following manner:

The recording head 32 receives a print instruction signal externally put in. In response to the signal, droplets of the recording liquid are jetted from the head 32 toward a printing paper not shown. At the same time, the carriage driving motor (not shown) controlled by the signal drives the carriage 34 carrying thereon the head/tank unit 31. Thus, the carriage 34 is moved along the shaft 35 to effect printing of a desired character such as letter, numeral, symbol etc. on the printing paper. As shown in FIG. 4, since the carriage 34 and therefore the head/tank unit 31 move along the shaft 35 rightward and leftward as viewed on the drawing, the supply line 37 connected with the head/tank unit 31 is also moved to and for describing circular arcs the center of which is the fixed point 38. As a result of this circular arc motion of the supply line 37 about the fixed point 38, there is produced a centrifugal force acting on the recording liquid with the supply line 37. Thus, so-called a pumping effect is obtained which produces an ink feeding force in supply line 37. Owing to this ink feeding force, the recording liquid is effectively supplied to the subsidiary tank 33 from the main tank 40 as the recording liquid in the subsidiary tank is consumed by printing.

Figure 4:
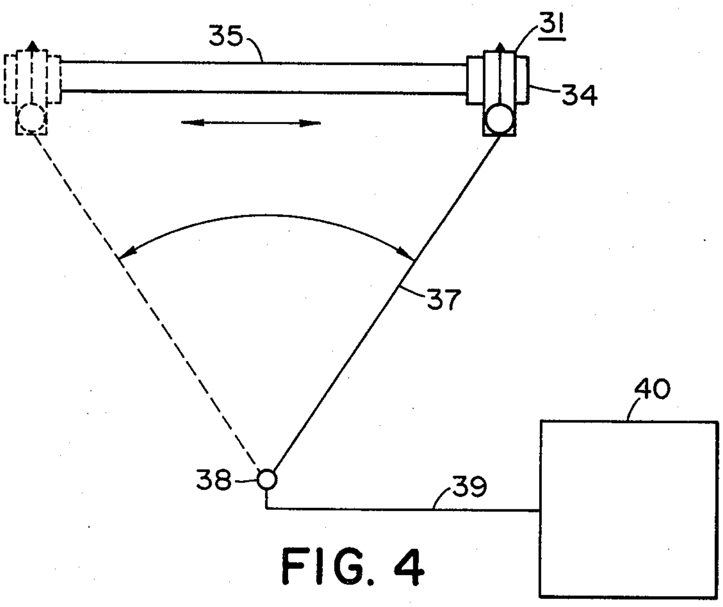

In an ink jet type recording apparatus formed as shown in FIGS. 3 and 4 according to the invention there is produced a pumping pressure in the liquid supply line extending from the main tank to the subsidiary tank in the manner described above. Generally, the value of the pumping pressure can be found mathematically, which is described hereinafter with reference to FIG. 5.

Figure 5:
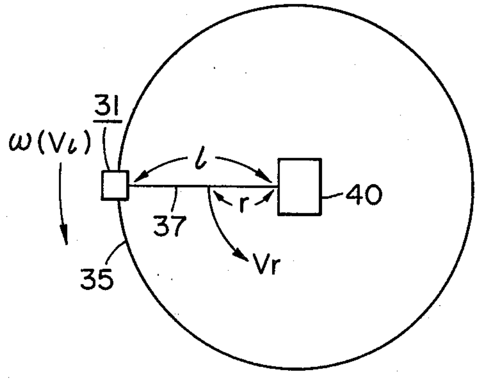
FIG. 5 illustrates the manner of operation of the embodiment.

For the purpose of explanation, the subsidiary tank 33 of the head/tank unit 31 in FIG. 5 is shown to be connected with the main tank 40 directly by the supply line 37 without and intermediate fixed point. In FIG. 5, the head/tank unit 31 is moved along the shaft 35 at an angular velocity of ω (speed: Vl). The supply line 37 extending from the main tank 40 to the head/tank unit 31 is measured to be in length and S in cross-sectional area. Let ρ denote the specific weight of the recording liquid, g the gravitational acceleration, Vr the velocity of the supply tank 37 at a point r distant from the side wall of the main tank, dr a minute area of the supply line at the distance r from the main tank, dp the pressure difference between the upstream and downstream sides of the recording liquid at the area dr and f the centrifugal force acting on the recording liquid at dr resulted from the swing (circular arc) motion about the main tank 40 (center), then F, that is the force which the recording liquid at dr receives by the pressure difference dp, can be represented by F=f. The force F and the centrifugal force f can be represented as follows:

$$F = S\left(P + \frac{dP}{dr}\,dr\right) - SP \qquad (1)$$

$$= S \cdot \frac{dP}{dr}\,dr$$

$$f = \frac{S\rho dr}{g} \cdot \omega^2 r \qquad (2)$$

From F=f $$S \cdot \frac{dP}{dr}\,dr = \frac{S\rho dr}{g} \cdot \omega^2 r \qquad (3)$$

Therefore, the pressure P can be represented by the following equation:

$$P = \frac{\rho}{2g} \cdot \omega^2 r^2 = \frac{\rho}{2g} \cdot Vr^2. \qquad (4)$$

Let this pressure P be the pumping pressure, then it will be understood that the pumping pressure P is proportional to the square of the speed of carriage 34, namely to the square of Vl.

In this manner, every time the carriage 34 is moved, there is produced a centrifugal force acting on the recording liquid in the supply line 37. The centrifugal force depends upon the running speed of the carriage and brings about a pumping effect by which the recording liquid is effectively supplied to the subsidiary tank 33 from the main tank 40.

Figure 6:
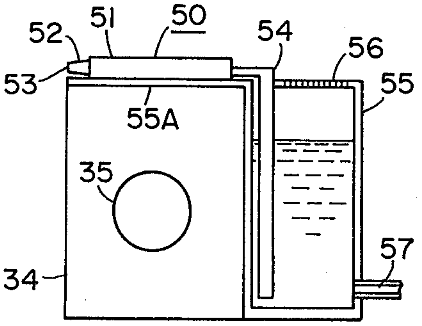
FIG. 6 shows a concrete form of head/tank unit used in the invention.

For high speed printing it is desired to reduce the weight and size of the head/tank unit 31 as much as possible. FIG. 6 shows a preferred embodiment of such head/tank unit satisfying the requirement.

In FIG. 6, the recording head generally designated by 50 is constituted of piezo-electric element 51, nozzle part 52, jet orifice 53 and supply tube 54. Designated by 55 is a subsidiary tank which has a projection part 55A. The projection part 55A is formed by extending one side wall (left-hand side wall as viewed on the drawing of FIG. 6) of the subsidiary tank and bending it toward the carriage 34 nearly at right angles relative to the upper surface side of the tank 55. The projection part 55A is fixed to the carriage 34 and the recording head 50 is fixed onto the projection part 55A. Thus, the carriage 34 supports the head on its upper surface and the subsidiary tank on its one side surface. As compared with the structure shown in FIG. 2, it is readily seen that the structure shown in FIG. 6 is smaller in size, lighter in weight and flatter in shape.

To keep the pressure within the subsidiary tank 55 at the same value as to the atmospheric pressure, again a vent hole 56 is provided in the top wall of the tank. It is preferred to form the top wall by using polyethylene, fluororesin or silicone resin. A plural number of vent holes 56 having an inner diameter less than 100 μm may be provided in such top surface. Alternatively, a membrane filter may be used. The subsidiary tank 55 has also a liquid inlet 57 provided at the lower portion of its one side wall (right-hand side wall as viewed on the drawing of FIG. 6). A supply line 37 is connected to the liquid inlet 57 to supply the recording liquid to the subsidiary tank 55.

As is understood from the foregoing, the present invention has may advantages over the prior art.

Figure 1:
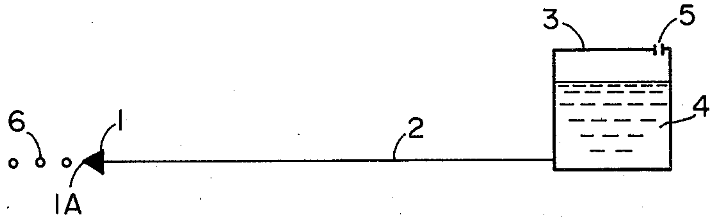
FIG. 1 is a schematic illustration of an ink jet type recording apparatus according to the prior art.
Figure 2A:
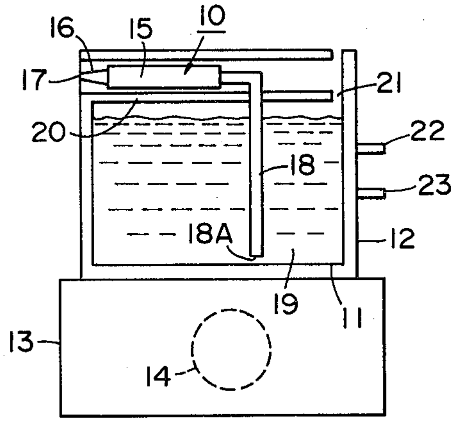
FIGS. 2A and B show an example of an improved ink jet type recording apparatus.
Figure 2B:
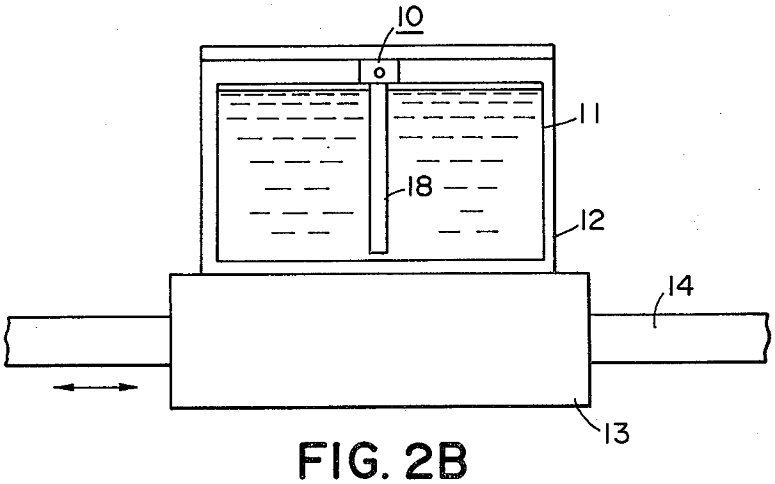

While the head/tank unit 31 according to the invention has basically the same structure as that of the prior art unit shown in FIG. 2, the former is smaller in size, lighter in weight and flatter in shape than the latter. Like the previously described embodiment shown in FIGS. 3 and 4, the embodiment shown in FIG. 6 is insensitive to tilt, vibration and impact of the main body of apparatus. There is no fear of the recording liquid leaking out from the tip of the recording head 50 or the meniscus at the orifice 53 being retrograded into the supply tube 54 by such tilt, vibration or impact. Also, the aforementioned trouble caused by air bubbles is eliminated by the present invention. Even when bubbles come into the supply lines 37 and 39, they can not enter the recording head 50 unlike the conventional cases where a bubble can go on directly into the recording head. In the apparatus according to the invention, the bubbles in the supply line are not allowed to directly enter the recording head but enter the subsidiary tank 55. Since the subsidiary tank 55 is provided with vent hole 56, the bubbles disappear there and never come into the recording head 50. Therefore, the trouble of orifice blockage is eliminated and a stable and reliable printing operation is assured. Furthermore, since the subsidiary tank serves also as a buffer to the pumping pressure, the trouble of leakage ink from the orifice is eliminated. This enables driving of the carriage at a higher speed than in the conventional apparatus shown in FIG. 1.

As previously described in detail with reference to FIGS. 3 and 4, feeding of ink to the subsidiary tank is accomplished by a pumping effect. This feature of the invention allows the bottom surface of the main tank 40 to lie on a level lower than the bottom of the subsidiary tank 33. Therefore, it is made possible to shape the apparatus thinly as a whole and use a larger capacity of main tank. In this case, when the liquid level of the recording liquid in the main tank 40 sinks down to a level lower than the bottom surface of the subsidiary tank 33, the recording liquid may flow backward from the subsidiary tank 33 to the main tank 40. To prevent such counter flow of the recording liquid there may be provided a check valve in the supply line 39 as a preferred modification of the above embodiment.

In summary, the important feature of the present invention resides in that a subsidiary tank whose capacity is smaller than a main tank and a recording head are united together to form a unitary unit which is mounted on a carriage and that said subsidiary tank and main tank are connected by a flexible tubing directly or via a fixed point. With this structure, the flexible tubing supply line is swingably moved to describe circular arcs every time the carriage is moved. As a result of this swing motion, the recording liquid in the supply line is subjected to a centrifugal force which produces a pumping effect. Therefore, the recording liquid is automatically supplied to the subsidiary tank from the main tank without use of any particular pumping device.

The above feature of the invention enables use of a very small capacity subsidiary tank mounted on the carriage. Since the capacity of the subsidiary tank is extremely small, the change of weight load on the carriage becomes negligibly small. Therefore, there is caused no change of carriage running speed by change of weight even when a linear motor or the like is used as the carriage driving motor. All of the impacts which may be produced when the carriage running at a high speed is struck against the guide end, are absorbed by the subsidiary tank itself and also the recording liquid contained therein. Therefore, the trouble of leakage of ink at the end part can be minimized as compared with the known apparatus in which such impact force acts on the recording head directly. Thus, according to the invention there is provided an ink jet type recording apparatus which assures a high quality and high speed printing.

What we claim is:

1. An ink jet type recording apparatus comprising:

a main tank for containing therein an amount of recording liquid;

a subsidiary tank disposed to receive a supply of recording liquid from said main tank through a supply line;

a recording head to which the recording liquid is supplied from said subsidiary tank through a supply pipe; and a carriage carrying thereon said subsidiary tank and said recording head;

wherein said supply line is fixed at an optionally selected point and the segment of said supply line extending between said subsidiary tank and said fixed point is swing movable to describe circular arcs having a center at said fixed point in accordance with the movement of said carriage so that recording liquid is supplied to said subsidiary tank from said main tank by a pumping pressure produced in said supply line.

2. An ink jet type recording apparatus according to claim 1, wherein the bottom surface of said main tank is situated at a level lower than that of said subsidiary tank.

3. An ink jet type recording apparatus according to claim 1, wherein said subsidiary tank is mounted on the side part of said carriage.

* * * * *